INVENTOR
J. R. PIERCE
BY [signature]
ATTORNEY

United States Patent Office 3,475,687
Patented Oct. 28, 1969

3,475,687

RADIO RECEIVING APPARATUS RESPONSIVE TO BOTH ELECTRIC AND MAGNETIC FIELD COMPONENTS OF THE TRANSMITTED SIGNAL

John R. Pierce, Warren Township, Somerset County, N.J., assignor to Bell Telephone Laboratories, Incorporated, New York, N.Y., a corporation of New York Filed Sept. 29, 1965, Ser. No. 491,288
Int. Cl. H04b *1/06*
U.S. Cl. 325—305 9 Claims

ABSTRACT OF THE DISCLOSURE

In a field component diversity system, an antenna arrangement is provided for simultaneous reception of one E field component and two orthogonal H field components of an electromagnetic wave at one point in space. These components are then combined to provide an output signal proportional to the energy density of the wave.

This invention relates to radio communication apparatus and more particularly, although in its broader aspects not exclusively, to mobile radio systems.

Radio reception may be seriously impaired by reflections of the transmitted signal. When an electromagnetic wave is reflected at normal incidence from a large wall, the interaction between the incident wave and the reflected wave creates a relatively simple standing wave pattern. An electric dipole antenna moving toward the wall finds nulls in the electric field which are repeated at one-half wavelength intervals. In the practical case of a mobile radio system, the transmitted wave may reach a mobile receiver via several paths because of reflection from nearby objects. Such multiple reflections normally create a complicated, three-dimension standing wave pattern. As a conventional mobile receiver passes rapidly through this complex pattern, the received signal strength may exhibit drastic fluctuations. At wavelengths shorter than about one meter, the signal strength variations encountered by a fast automobile can have appreciable components at audio frequencies.

It is accordingly an object of the present invention to improve radio reception in the presence of standing wave patterns caused by reflections of the transmitted signal.

More particularly, it is an object of the present invention to improve the reception of a mobile receiver passing through such a standing wave pattern.

In a principal aspect, the present invention takes the form of a radio communication system wherein the receiving apparatus is responsive to both the electric and the magnetic field components of the transmitted electromagnetic signal. In the earlier example of a plane wave reflected normally from a large wall, wherever nulls occur in the electric field E there exists a maxima in the magnetic field H. Indeed, in this simple example, the electromagnetic energy density ½ $(\epsilon|E|^2+\mu|H|^2)$ is constant throughout the pattern. In accordance with a principal feature of the present invention, the receiving apparatus is adapted to detect and combine both the electric and the magnetic field components of the transmitted wave in order to improve the consistency of reception.

According to a further feature of the invention, the receiving apparatus may be adapted to sense the electromagnetic energy density of the transmitted signal. As an illustration, the receiving station may be equipped with a straight, vertical antenna for sensing the electric field $E_z$ of a vertically polarized wave. In addition, a pair of orthogonal loop antennas having axes perpendicular to each other and to the vertical antenna may be employed to detect the magnetic field components $H_x$ and $H_y$. The three resulting antenna signals may then be applied to separate square-law detectors and the three detector outputs added to obtain an output signal proportional to the electromagnetic energy density. If the transmitted signal is amplitude-modulated in the conventional manner, the receiver may compute the square root of the resulting energy density signal to achieve linear detection. By providing means for sensing the electromagnetic energy density rather than merely detecting a single component of the electromagnetic wave, a substantial reduction in those signal fluctuations which are caused by standing wave patterns may be achieved.

According to another feature of the present invention, means may be included to form the output signal from only the strongest of the various received component signals. The component signals derived from the different antennas may be expected to contribute the same noise power to the output, even though the desired signal may be strong at one antenna output and weak at another. A significant improvement in the over-all signal-to-noise ratio may be achieved, therefore, by selecting only that antenna output which delivers the strongest signal. This techniques of preferential selection is particularly adapted for use in conjunction with radio systems using frequency modulation.

These and other objects, features and advantages of the invention may be more fully understood by considering the following detailed description. In the course of this description references will frequently be made to the attached drawings in which.

Figure 1:
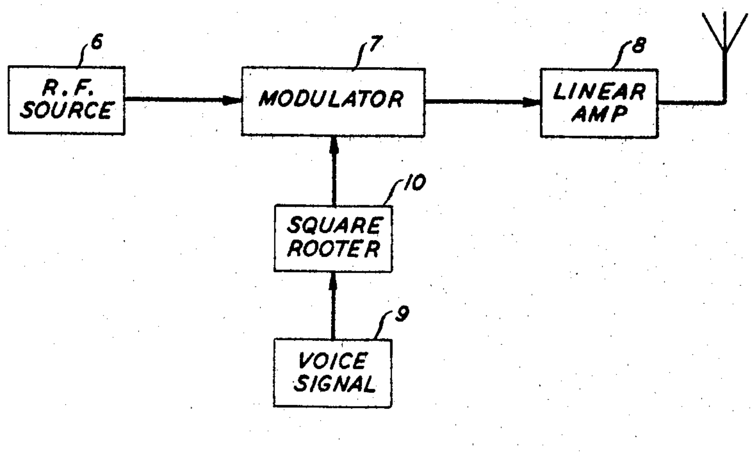
FIG. 1 illustrates in block diagram form an amplitude-modulated transmitter whose output signal power is proportional to the amplitude of the modulating waveform.
Figure 3:
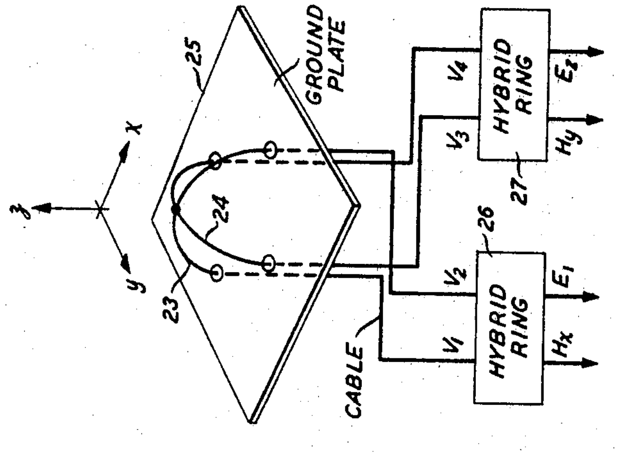
FIG. 3 shows a second type of receiving antenna which comprises a pair of semiloops mounted on a ground plane and which may be employed to instrument the invention.
Figure 2:
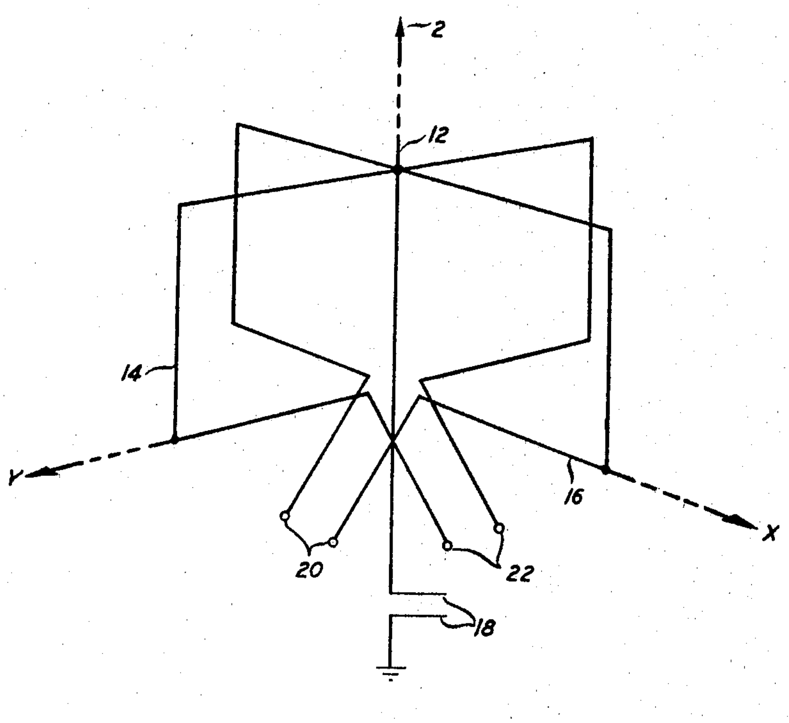
FIG. 2 illustrates a receiving antenna employing a vertical dipole and two orthogonal loops which may be used to sense both the electric and magnetic fields of an electromagnetic wave.

In a conventional amplitude-modulated transmitter the instantaneous amplitude of the propagated electric (or magnetic) field component is directly proportional to the amplitude of the modulating signal. Accordingly, the electromagnetic energy density of the transmitted wave is proportional to the square of the modulating signal. When receiving apparatus of the type illustrated in FIGS. 2 and 3 is employed to detect energy density rather than a single component of the electromagnetic signal, means for taking the square root of either the transmitted or received waveform must be added to the system in order to achieve linear reproduction. As an illustration, the transmitting arrangement shown in block diagram form in FIG. 1 includes means for taking the square root of the modulating signal such that the instantaneous radiated power is proportional to the instantaneous amplitude of the modulating signal. The transmitter shown in FIG. 1 comprises a source of a radio frequency signal 6, a conventional modulator 7, and a linear amplifier 8 whose output is connected to the transmitting antenna. The modulating voice signal from source 9 is applied to a "square rooter" 10 whose output is connected to the modulator 7. A variety of devices which produce an output voltage proportional to the square-root of the input voltage may be employed to instrument the square rooter 10. Such an arrangement is disclosed in U.S. Patent 2,702,857, which issued to F. B. Berger et al. on Feb. 22, 1955.

The antenna shown in FIG. 2 of the drawings comprises a vertical element 12 and a pair of rectangular loops 14 and 16. The vertical element 12 may be used to sense the electric field component of a vertically polarized electromagnetic signal and includes a feedline connection at its lower extremity. For purposes of illustration, the vertical element 12 is shown positioned along the $z$-axis of a three-dimensional Cartesian coordinate system. The lower "edge" of the unshielded loop 16 is positioned along the $x$-axis. Loop 14 lies in a plane perpendicular to the $x$-axis with its bottom edge along the $y$-axis. Both loops are opened at the center of these bottom edges to provide feedline connections which are positioned symmetrically about the $z$-axis. A voltage proportional to the $H_y$ magnetic field component is developed across the feedline conductors 20 which connect to the loop 16. Similarly, the signal appearing across the conductors 22 feeding the loop 14 is proportional to the strength of the magnetic field component $H_x$.

Thus, for example, an incoming vertically polarized plane wavefront which is propagated along the $x$-axis induces signals at terminals 18 and 20 but none at terminals 22 since no magnetic field exists parallel to the direction of the wave travel.

FIG. 3 of the drawings shows a perspective view of a second type of antenna which may be employed to detect both the electric and magnetic fields of a propagated plane wave. This antenna consists of two double-ended "semiloops" 23 and 24 with their planes perpendicular to one another and to the plane of the conductive ground plate 25 upon which they are mounted. The loops may be made of equal size and connected at their intersection. Each semiloop has two outputs. The outputs from loop 23 are connected by cable to two inputs of a conventional hybrid ring 26. The $H_x$ output voltage from hybrid 26 is the difference between the two input voltages $V_1$ and $V_2$. The sum of these two voltages is proportional to the $E_z$ field strength and appears at the other output of hybrid 26. Likewise, a hybrid ring 27 is connected by cable to two outputs of semiloop 24 and develps voltages proportional to the $H_y$ and $E_z$ fields. The two $E_z$ voltages from hybrids 26 and 27 are substantially identical.

A variety of known antennas may be used in accordance with the invention to sense both the electric and magnetic field components of an incoming wave. In addition, where it is expected that the incoming signals traveling to the receiver location via different paths may also have differing polarizations, six instead of three field sensing antennas may be employed. For example, three straight "wire" antennas respectively aligned with the three axes allow detection of the electric field regardless of its polarization or direction of travel. Likewise, three orthogonal loops which are respectively perpendicular to the three axes may be used to detect the total magnetic field regardless of its orientation.

Figure 4:
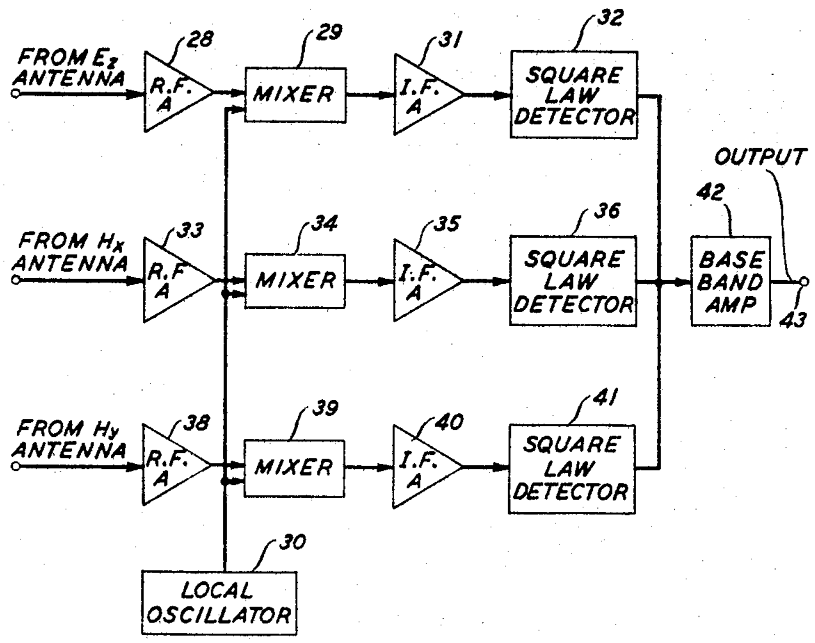
FIG. 4 illustrates a receiving system which may be employed in accordance with the invention to detect and combine the received electric and magnetic field components.

FIG. 4 of the drawings shows a receiving arrangement for amplifying, detecting and combining three component signals from an antenna of the type shown in FIGS. 2 or 3. The component produced by the electric field $E_z$ is applied to the input of an R.F. amplifier 28 whose output is connected at an input of a mixer 29. The amplified signal from amplifier 28 is heterodyned against the signal from a local oscillator 30 in the mixer 29 and passed to an intermediate frequency amplifier 31. The envelope of the resulting signal is detected and squared in the square-law detector 32. The magnetic field component $H_x$ is applied to a small group of devices comprising an R.F. amplifier 33, mixer 34, I.F. amplifier 35 and square-law detector 36. Likewise, the $H_y$ component is applied to an R.F. amplifier 38, mixer 39, I.F. amplifier 40 and square-law detector 41. The output currents from square-law detectors 32, 36 and 41 are applied in common to an input of a baseband amplifier 42. Square-law detectors are well known and are discussed, for example in volume 15, Crystal Rectifiers, Radiation Laboratory Series, McGraw Hill (1948).

The signal appearing at the output 43 of baseband amplifier 42 is directly proportional to the magnitude of the electromagnetic energy density at the receiving antenna location. This may be appreciated by recognizing that the receiving apparatus shown in FIG. 4 squares and adds signals which are proportional to the three individual field components.

Figure 5:
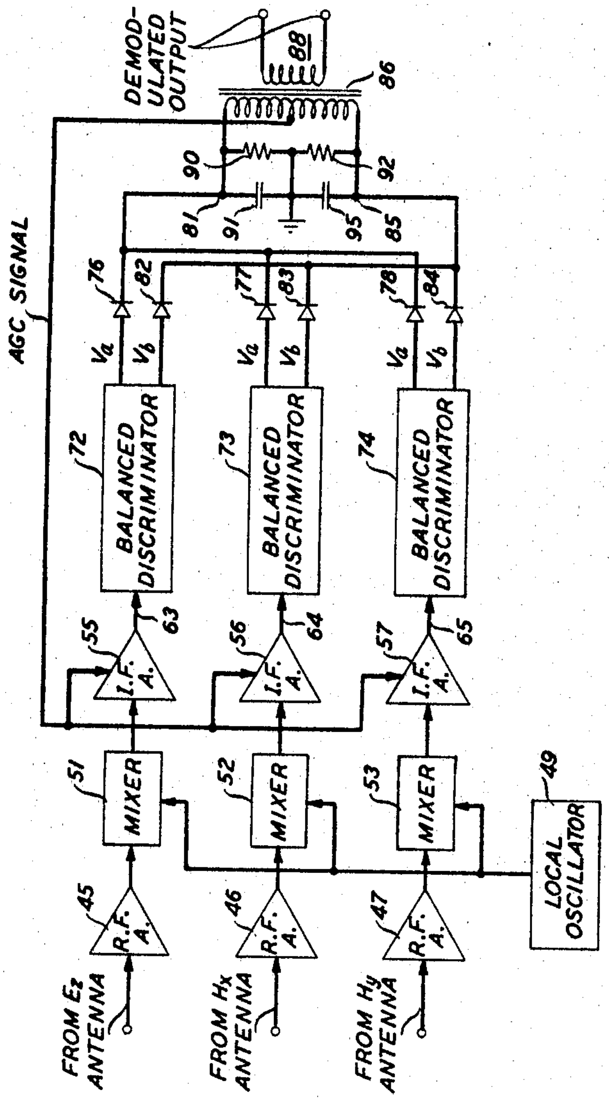
FIG. 5 illustrates a frequency modulation receiver according to the invention which includes means for selecting the output signal from that component channel which receives the largest amplitude signal.

The principles of the present invention may also be applied to provide improved reception of a frequency modulated signal. As was the case with the receiver shown in FIG. 4 of the drawings, the arrangement shown in FIG. 5 is used in conjunction with an antenna capable of sensing both the electric and magnetic field components in an electromagnetic wave. The signal which is proportional to the electric field strength is applied to the input of an R.F. amplifier 45 while the magnetic field components $H_x$ and $H_y$ are applied to the inputs of R.F. amplifiers 46 and 47, respectively. Each of the amplified signals is heterodyned against the beat frequency signal from a local oscillator 49. For this purpose, the outputs of R.F. amplifiers 45, 46 and 47 are connected to mixers 51, 52 and 53, respectively. The intermediate frequency signals from the mixers 51, 52 and 53 are applied to intermediate frequency amplifiers 55, 56 and 57, respectively.

Figure 6:
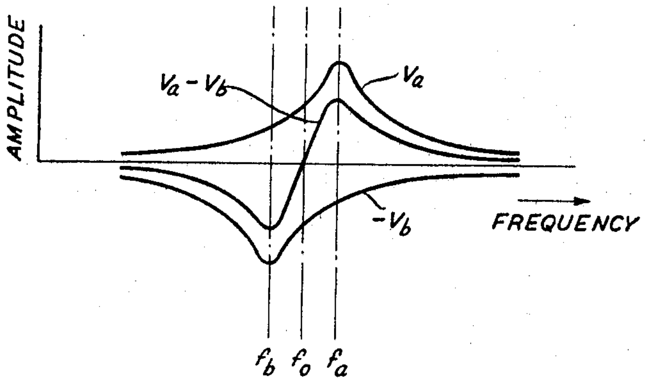
FIG. 6 shows the manner in which the voltages appearing at the outputs of the discriminators of FIG. 4 vary with changes in frequency.

Three balanced discriminators 72, 73 and 74 are employed to convert changes in the frequency of the signals appearing at the output of amplifiers 55 through 57, respectively, into circuit voltage changes. Each of the discriminators includes a pair of tuned circuits, one of which is resonant slightly above the center frequency, $f_o$, and the other resonant slightly below. A typical balanced discriminator is described in detail in Chapter XII, Vacuum Tube Circuits and Transistors, by L. B. Arguimbau, Wiley and Sons (1956). Each discriminator produces two R.F. output signals $V_a$ and $V_b$ which appear across the two tuned circuits, respectively. FIG. 6 shows the manner in which the amplitude of voltages $V_a$ and $V_b$ vary as frequency changes. Note that the curve showing $V_b$ in FIG. 6 is inverted in order to illustrate the development of the difference curve $(V_a - V_b)$. The $V_a$ output conductors from discriminators 72 through 74 are passed through detector diodes 76, 77 and 78 to terminal 81. Similarly, the $V_b$ output conductors from discriminators 72 through 74 are connected by way of detector diodes 82, 83 and 84 to terminal 85. The voltage appearing between terminals 81 and 85 is the instantaneous amplitude difference voltage $(V_a - V_b)$ whose variation with frequency is illustrated in FIG. 6. For faithful reproduction, the frequency variation is limited to the straight portion of this difference voltage curve. The difference voltage is applied to the primary winding of an output transformer 86.

The demodulated audio frequency component of the strongest received signal is applied across primary winding 86. A resistance 90 and a capacitor 91 are connected in parallel between terminal 81 and ground and, in combination with diodes 76, 77 and 78, form an envelope detector for the three $V_a$ outputs from the discriminators. A self-biasing voltage is developed across resistor 90 and capacitor 91 such that those diodes connected to the outputs of the discriminators producing weak signals are reverse biased. In this manner, noise from those channels receiving low signal levels is not contributed to the output. The parallel combination of resistance 92 and capacitor 95 connected between terminal 85 and ground performs a like function for the $V_b$ outputs from the discriminators. The time constant of these two parallel R-C circuits is adjusted to be sufficiently rapid to bypass both the radio frequency components as well as those components created by the time-division switching in the time-shared I.F. amplifier. The demodulated output voltage appears across secondary winding 88.

A center-tap connection on primary winding 86 provides an automatic gain control voltage which is proportional to the sum of the rectified outputs applied to terminals 81 and 85. A connection from this center-tap connection to the control terminal of I.F. amplifiers 59, 60 and 61 provides negative feedback to vary the gain of the I.F. amplifiers in accordance with the amplitude of the strongest component signal.

It is to be understood that the embodiments of the invention which have been described are merely illustrative of the applications of the principles of the invention. Numerous modifications may readily be devised by those skilled in the art without departing from the spirit and scope of the invention.

What is claimed is:

1. In combination, a first antenna for developing a first electrical signal having an amplitude which is substantially proportional to the electric field intensity of an electromagnetic signal, a second antenna for developing a second electrical signal having an amplitude which is substantially proportional to the magnetic field intensity of said electromagnetic signal, means for squaring both said first and said second electrical signals to form first and second squared signals, respectively, and means for constructively combining said squared signals to produce an output signal.

2. The combination as set forth in claim 1 wherein said first and said second antennas are positioned contiguously to sense the electric and magnetic fields at effectively the same point in space.

3. In a receiver for linearly polarized, modulated radio waves, the combination comprising an antenna structure for producing at least three electrical signals proportional respectively to the electric field intensity directed along a first axis, the magnetic field intensity directed along a second axis, and the magnetic field intensity directed along a third axis, said first axis being substantially parallel with the polarization direction of said radio waves and said first, second and third axes being mutually perpendicular, said antenna structure being positioned to sense said electric and magnetic field intensities at effectively the same point in space, and means for constructively combining said electrical signals to form an output signal.

4. A combination as set forth in claim 3 wherein said means for constructively combining said electrical signals includes means for squaring the amplitudes of said electrical signals to form squared signals and means for adding said squared signals to form said output signal whereby the amplitude of said output signal is proportional to the energy density of said electromagnetic signal.

5. A combination as set forth in claim 3 wherein said means for constructively combining said electrical signals includes means for demodulating said electrical signals to form baseband signals.

6. In combination, a first antenna for developing a first signal voltage proportional to the electric field intensity of a propagated electromagnetic wave, a second antenna for developing a second signal voltage proportional to the magnetic field intensity of said propagated electromagnetic wave, said first and said second antennas being located contiguously to sense the electric and magnetic field intensities of said wave at the same effective position in space, detecting means for converting said first and said second signal voltages into first and second baseband signals respectively, an output circuit, and means for applying the strongest of said baseband signals to said output circuit.

7. The combination set forth in claim 6 wherein said detecting means comprises at least one frequency modulation discriminator.

8. Mobile radio reception apparatus adapted to receive electromagnetic waves linearly polarized in a predetermined direction which comprises, in combination, a first antenna having at least a portion of its structure oriented parallel to said predetermined direction for sensing the electric field intensity of said electromagnetic wave, a pair of loop antennas for sensing the magnetic field intensity of said electromagnetic wave, said loop antennas having their axes mutually perpendicular and perpendicular to said predetermined direction, amplifying and detecting means connected to each of said three antennas for producing baseband signals, an output circuit, and means for applying at least the strongest of said baseband signals to said output circuit.

9. The combination set forth in claim 8 wherein said antennas are located to sense the electric and magnetic field intensities of said wave at effectively the same position in space.

References Cited

UNITED STATES PATENTS

| | | | |
|---|---|---|---|
| 2,305,917 | 12/1942 | Beers | 325—305 XR |
| 2,604,587 | 7/1952 | Lyons | 325—304 |
| 3,242,430 | 3/1966 | Ghose | 325—305 |
| 3,341,778 | 9/1967 | Dryden | 325—305 |

ROBERT L. GRIFFIN, Primary Examiner

R. S. BELL, Assistant Examiner

U.S. Cl. X.R.

325—304, 367, 372; 343—728